US006476122B1

(12) United States Patent
Leyden

(10) Patent No.: US 6,476,122 B1
(45) Date of Patent: Nov. 5, 2002

(54) SELECTIVE DEPOSITION MODELING MATERIAL

(75) Inventor: Richard Noel Leyden, Topanga, CA (US)

(73) Assignee: Vantico Inc., Brewster, NY (US)

( * ) Notice: Subject to any disclaimer, the term of this patent is extended or adjusted under 35 U.S.C. 154(b) by 0 days.

(21) Appl. No.: 09/334,086

(22) Filed: Jun. 16, 1999

Related U.S. Application Data

(60) Provisional application No. 60/097,241, filed on Aug. 20, 1998.

(51) Int. Cl.$^7$ .................. C08L 25/08; C08L 23/00; C08L 23/04; C08L 5/12; B29C 41/02
(52) U.S. Cl. .................. 524/577; 524/528; 524/296; 524/270; 264/401
(58) Field of Search .................. 524/577, 528, 524/488, 296, 277, 270, 271; 264/401

(56) References Cited

U.S. PATENT DOCUMENTS

| | | | | |
|---|---|---|---|---|
| 3,655,414 A | | 4/1972 | Hoffman et al. | 106/38.8 |
| 3,880,790 A | | 4/1975 | McLaren et al. | 260/28.5 |
| 3,884,708 A | | 5/1975 | Burker | 106/38.6 |
| 3,887,382 A | | 6/1975 | Soloman | 106/38.8 |
| 3,932,332 A | | 1/1976 | Douglas et al. | 260/28.5 |
| 3,964,915 A | | 6/1976 | Doenges et al. | 106/38.6 |
| 4,116,914 A | * | 9/1978 | Coran et al. | 525/222 |
| 4,144,075 A | | 3/1979 | Koenig | 106/38.8 |
| 4,659,383 A | | 4/1987 | Lin et al. | 106/27 |
| 4,743,238 A | * | 5/1988 | Colon et al. | 604/361 |
| 4,758,276 A | | 7/1988 | Lin et al. | 106/27 |
| 4,830,671 A | | 5/1989 | Frihart et al. | 106/27 |
| 4,833,023 A | * | 5/1989 | Tsukahara et al. | 428/349 |
| 4,851,045 A | | 7/1989 | Taniguchi | 106/31 |
| 4,878,946 A | | 11/1989 | Tabayashi et al. | 106/31.29 |
| 4,889,560 A | | 12/1989 | Laeger et al. | 106/27 |
| 5,006,170 A | | 4/1991 | Schwarz et al. | 106/20 |
| 5,006,383 A | | 4/1991 | Arguesee | 524/277 |
| 5,041,161 A | | 8/1991 | Cooke et al. | 106/22 |
| 5,122,187 A | | 6/1992 | Schwarz et al. | 106/25 |
| 5,151,120 A | | 9/1992 | You et al. | 106/27 |
| 5,256,717 A | * | 10/1993 | Stauffer et al. | 524/293 |
| 5,259,873 A | | 11/1993 | Fujiola | 106/20 |
| 5,303,141 A | | 4/1994 | Batchelder et al. | 364/149 |
| 5,354,368 A | | 10/1994 | Larson, Jr. | 106/22 |
| 5,372,768 A | | 12/1994 | Soleman | 264/221 |
| 5,409,530 A | | 4/1995 | Kambayashi et al. | 106/27 |
| 5,421,868 A | | 6/1995 | Ayalia-Esquilin et al. | 106/20 |
| 5,514,209 A | | 5/1996 | Larson, Jr. | 106/30 |
| 5,518,537 A | | 5/1996 | Muschia, III | 106/191 |
| 5,531,819 A | | 7/1996 | Sawada | 106/31 |
| 5,555,176 A | | 9/1996 | Menhennett et al. | 364/468.5 |
| 5,560,765 A | | 10/1996 | Sawada | 106/22 |
| 5,597,856 A | | 1/1997 | Yu et al. | 524/227 |
| 5,605,941 A | | 2/1997 | Steinmann et al. | 522/170 |
| 5,607,501 A | | 3/1997 | Fujioka | 106/22 |
| 5,624,483 A | | 4/1997 | Fujioka | 106/31.24 |
| 5,695,707 A | | 12/1997 | Almquist et al. | 264/401 |
| 5,700,406 A | | 12/1997 | Menhennett et al. | 264/40.4 |
| 5,717,599 A | | 2/1998 | Menhennett et al. | 364/468.25 |
| 5,738,817 A | * | 4/1998 | Danforth et al. | 264/603 |
| 5,747,573 A | | 5/1998 | Ryan | 524/270 |
| 5,750,607 A | | 5/1998 | Gerard et al. | 524/271 |
| 5,796,207 A | * | 8/1998 | Safari et al. | 310/358 |
| 5,855,836 A | * | 1/1999 | Leyden et al. | 264/401 |
| 5,863,319 A | * | 1/1999 | Baker et al. | 106/31.29 |
| 5,989,476 A | * | 11/1999 | Lockard et al. | 264/401 |
| 6,034,168 A | * | 3/2000 | Wang | 524/505 |
| 6,043,323 A | * | 3/2000 | Steinmann et al. | 525/531 |
| 6,057,399 A | * | 5/2000 | King et al. | 524/590 |
| 6,080,480 A | * | 6/2000 | Shiba et al. | 428/355 R |
| 6,153,667 A | * | 11/2000 | Howald | 523/160 |
| 6,300,398 B1 | * | 10/2001 | Jialanella et al. | 524/275 |
| 6,365,271 B1 | * | 4/2002 | Miller et al. | 428/346 |

FOREIGN PATENT DOCUMENTS

| | | |
|---|---|---|
| EP | 0 410 412 | 1/1991 |
| WO | 97/11837 | 4/1997 |

OTHER PUBLICATIONS

Lewis, Sr., Richard J; Hawley's Condensed Dictionary 12th Ed., Van Nostand Reinhold Company, New York (p. 491), 1993.*

* cited by examiner

Primary Examiner—Vasu Jagannathan
Assistant Examiner—Callie E. Shosho
(74) Attorney, Agent, or Firm—Foley & Lardner

(57) ABSTRACT

The present invention relates to a selective deposition modeling material containing a base material, a plasticizing component containing at least 10% by weight of at least one plasticizing agent that is solid at ambient conditions, and at least one tackifying resin that is compatible with the base material and the plasticizing component, wherein the modeling material has a viscosity of less than about 30 centipoise at 130° C. The selective deposition modeling material can alternatively contain about 52% to 98% of a reactive polymeric material that is a mixture of at least one compound containing at least one glycidyl group per molecule, at least one compound having at least one terminal unsaturated group per molecule, at least one compound having at least one vinyl ether group per molecule or mixtures thereof; and a cure agent or activator; and optionally a non-reactive polymeric material or wax material, wherein the modeling material contains a fast set inducing segment content of about 10% to 70% by weight. The present invention further relates to a method for producing a three-dimensional article using said modeling materials.

14 Claims, No Drawings

SELECTIVE DEPOSITION MODELING MATERIAL

This application claims the benefit of provisional application No. 60/097,241, filed Aug. 20, 1998.

FIELD OF THE INVENTION

The present invention relates to a novel materials suitable for use as a selective deposition modeling material, particularly in ink jet-type or thermal stereolithography equipment. The novel materials described herein solidify quickly on cooling from a melt to self supporting solids (fast setting) while retaining other physical properties required for ink jet modeling. The modeling material contains a base material that serves as a backbone for the modeling material, a plasticizing component containing at least 10% by weight of at least one plasticizing agent that promotes fast setting and at least one tackifying resin that is compatible with the base material and the plasticizing component. The modeling materials can optionally contain more than 51% by weight of at least one reactive component, wherein at least a portion thereof having fast setting properties.

BACKGROUND OF THE INVENTION

One of the most significant advances in rapid prototype design has been the development of stereolithography process systems. Other rapid prototype systems of note are laminated object manufacturing (LOM), Fused Deposition Modeling (FDM), Selective Laser Sintering (SLS), and 3D Printing. Stereolithography produces prototype parts directly from a vat of reactive resin using three dimensional data to direct an energy source. The energy source cures successive layers of the reactive resin over selected areas to produce the three-dimensional part. Stereolithography systems have in many cases eliminated the need to manufacture tooling for short run or prototype designs and significantly shortened the design and manufacturing cycle. Stereolithography systems, however, require a relatively large vat of reactive resin and an energy source. Due to the cost of the equipment and chemical nature of the resin material, stereolithography systems are generally not practical office accessories. Hence, a relatively unfulfilled group in the field of rapid prototyping are the actual designers working in their offices. Relocating prototype manufacturing from the shop floor to the designer's office represents the next step in the evolution of rapid prototype design and manufacturing.

At least some selective deposition modeling systems can be used in an office environment to produce a prototype. Selective deposition modeling systems are known. Particular examples of selective deposition systems are the Actua 2100 Multi-jet Modeler system from 3D Systems, Inc., Valencia, Calif.; Genisys® 3D Printer™ (technology purchased from IBM) from Stratasys Corporation, Minnesota, Z402™, rapid prototyping system from Z-Corporation, Massachusetts, and the Model Maker II from Sanders, New Hampshire. The selective deposition systems described in published PCT patent application (International Publication Number WO 97/11837), which is incorporated herein by reference, to 3D Systems, Inc. is believed to represent said Actua system. In said application, the selective deposition modeling systems are described as including thermal stereolithography.

The patents directed to thermal stereolithography and extrusion modeling equipment contemplate the use of room temperature solid compositions that flow when subjected to elevated temperatures. 3D Systems, for example, discloses in their specifications for thermal stereolithography that the compositions are normally solid at room temperature, but are rendered flowable when heated above their melting points. Suggested materials are thermoplastics, hot-melt glue, wax, and cerro alloys. U.S. Pat. No. 5,695,707, column 4, lines 17–23. IBM discloses in their specifications that an extrusion system can use hot melt adhesives, mixtures of synthetic polymers, wax, resin, metallic alloys, thermoplastic polymers, thermosetting polymers, radiation- or heat-curable polymers, and mixtures thereof. U.S. Pat. No. 5,303,141, columns 6–7 (bridging).

3D Systems further discloses in a published PCT application WO 97/11837 a number of preferred formulations for selective deposition modeling comprising (examples 1–6):

a) paraffin wax having a melting point of 60° C. (20–44% by weight); b) a pure monomer hydrocarbon resin comprising a copolymer of α-methylstyrene and vinyl toluene having a viscosity of 1000 centipoise at 130° C. and a softening point of 78–95° C. (20–50% by weight); c) a medium hard microcrystalline ester wax having a viscosity of 16 centipoise at 100° C. and a melting point of 78–86° C. (0–12% by weight); d) a hard microcrystalline wax having a viscosity of 16 centipoise at 100° C. and a melting point of 93° C. (5–10% by weight); e) a soft microcrystalline wax having a viscosity of 13 centipoise at 100° C. and a melting point of 69° C. (5–20% by weight); f) an ethylene-vinyl acetate copolymer having a viscosity of 575 centipoise at 140° C. and a melting point of 92° C. (2.3–25% by weight); g) an optional antioxidant (0–2% by weight); h) an optional dioctylphthalate (plasticizer) (0–2% by weight); i) an optional dioctylterephthalate (plasticizer) (0–2.5% by weight); j) an optional antioxidant (0–3% by weight); k) an optional diisononyl phthalate (plasticizer) (0–2% by weight); and 1) an optional dye or coloring compound, not used.

3D Systems discloses in the same published PCT Application an additional preferred composition containing a UV-curable component in example 7 comprising:

a) paraffin wax having a melting point of 60° C. (21% by weight); m) a methacrylate terminated polystyrene (51% by weight); c) a medium hard microcrystalline ester wax having a viscosity of 16 centipoise at 100° C. and a melting point of 78–86° C. (12% by weight); d) a hard microcrystalline wax having a viscosity of 16 centipoise at 100° C. and a melting point of 93° C. (5% by weight); e) a soft microcrystalline wax having a viscosity of 13 centipoise at 100° C. and a melting point of 69° C. (5% by weight); f) an ethylene-vinyl acetate copolymer having a viscosity of 575 centipoise at 140° C. and a melting point of 92° C. (5% by weight); and n) a photoinitiator (1% by weight). No actual physical properties for such a composition or cured article resulting therefrom are provided.

3D Systems discloses in the same published PCT Application an additional preferred composition containing an epoxy resin component (cationically curable) in example 8 comprising:

o) polyethylene oxide having an average molecular weight of 2000 (77% by weight); p) an epoxy novolac oligomer (22% by weight); and q) a cationic photoinitiator (1% by weight). No actual physical properties for such a composition or cured article resulting therefrom are provided.

3D Systems discloses in the same published PCT Application an additional preferred composition containing a UV-curable component in example 9 comprising:

n) a photoinitiator (1% by weight); o) polyethylene oxide having an average molecular weight of 2000 (77% by weight); and r) a multifunctional acrylate (22% by weight). No actual physical properties for such a composition or cured article resulting therefrom are provided.

A number of patents have been issued to BPM Technology that are directed to an ink-jet type of modeling systems. The ink jet system employs a piezoelectric jet. Each of the patents suggests that an appropriate build material melts at a temperature from about 50 to 250° C., cools quickly and adheres to itself, and has a low rate of shrinkage. A preferred build material comprises a solution of a resin having a hydroxyl number of from about 5 to 100, and a molecular weight greater than about 500, dissolved in at least one primary aromatic sulfonamide. The aromatic sulfonamide allegedly provides the necessary self-adhesion properties. Phenolic resins prepared by the reaction of phenol with formaldehyde are particularly preferred as the resin. The build material can optionally further include antioxidants and flexibilizers.

Ink formulations for ink jet printers are well-known. Such inks, however, are not suitable for selective deposition modeling systems, particularly thermal stereolithography. Conventional ink formulations fail to have sufficient mechanical strength for this purpose. U.S. Pat. No. 5,531,819, assigned to Brother Kogyo, is representative of the teachings in ink jet dyes. The composition, which is solid at room temperature, comprises wax having a melting point between 50 and 130° C., a resin, a colorant, and a plasticizer. The composition contains between 30 to about 90% by weight of wax, about 5 to about 70% by weight of a resin having a weight average molecular weight greater than 500, about 1 to 20% by weight of plasticizer, and about 0.1 to 10% by weight of colorant. Examples of suitable resins include polyethylene and ethylene-vinyl acetate copolymer, and mixtures thereof. The plasticizer is most preferably a phthalic acid ester that is liquid at room temperature.

Investment casting materials are also unsuitable for use in selective deposition modeling systems due to their very high viscosity. A representative composition of investment castings is shown in U.S. Pat. No. 5,372,768, assigned to Yates Manufacturing Co. The composition comprises at least about 30% by weight of a thermoplastic material having a viscosity at 200° F. of less than about 20,000 centipoise., and, as a filler, at least about 5% by weight of a cross-linked poly(methacrylate). The composition can further include ethylene vinyl acetate or polyethylene to increase the viscosity of the melted material and to increase the hardness and toughness of the solidified material.

Hot melt adhesives are generally not suitable for use in selective deposition modeling systems because the melt viscosities are generally much too high. A representative composition of hot melt adhesives is shown in U.S. Pat. No. 5,750,607, assigned to Shell Oil Company. The compositions comprise a block copolymer having an overall apparent molecular weight in the range of 200,000 to 500,000, a tackifying resin, a plasticizing oil, and a gelling agent, such as a wax, to prevent migration of the plasticizing oil.

Despite the presence of numerous phase change compositions, there is exists a need in the field of selective deposition modeling for a composition having improved strength and toughness. The present invention described hereafter meets this objective and others that will be clear to those skilled in the art.

SUMMARY OF THE INVENTION

The present invention relates to a selective deposition modeling material containing a base material, a plasticizing component containing at least 10% by weight of at least one plasticizing agent that is solid at ambient conditions, and at least one tackifying resin that is compatible with the base material and the plasticizing component, wherein the modeling material has a viscosity of less than about 30 centipoise at 130° C.

The base material preferably comprises a mixture of long-chain polyolefinic molecules having a number average molecular weight of about 500 to 10,000, more preferably about 4000. The base material preferably comprises a mixture of polyolefinic molecules having sufficient branching that allows long-range chain entanglement and provides interstitial voids for the positioning of plasticizing agents between and amongst adjacent polyolefinic molecules.

The plasticizing component is preferably a mixture of at least one plasticizing agent that is solid at ambient conditions and at least one plasticizing agent that is liquid at ambient conditions.

The tackifying resin is advantageously compatible with the base material and each plasticizing agent in the plasticizing component and acts as a bridge between the base material and plasticizing component to produce a homogenous single-phase solution.

The modeling material of the present invention preferably contains about 50% to 70% by weight of base material, about 8% to 15% of plasticizing component, about 15% to 30% of tackifying resin, and optionally, customary additives with the total amount of the recited components totaling 100% by weight. More preferably, the modeling material contains about 60% to 65% of base material, about 10% to 12% of plasticizing component, about 20% to 25% of tackifying resin, and optionally, customary additives with the total amount of the recited components totaling 100% by weight. Alternatively, the modeling material described herein contains about 60% to 65% of base material, about 10% to 12% of plasticizing component, about 20% to 25% of tackifying resin, and optionally, customary additives with the total amount of the recited components totaling 100% by weight, and wherein the base material contains a mixture of at least one thermoplastic and at least one thermosetting material.

In alternative embodiment, the selective deposition modeling material of the present invention contains about 52% to 98% of a reactive polymeric material that is a mixture of at least one compound containing at least one glycidyl group per molecule, at least one compound having at least one terminal unsaturated group per molecule, at least one compound having at least one vinyl ether group per molecule or mixtures thereof; and a cure agent or activator; and optionally a non-reactive polymeric material or wax material, wherein the modeling material contains a fast set inducing segment content of about 10% to 70% by weight. More preferably, the selective deposition modeling material of the alternative embodiment contains a polyethylene segment content of about 10% to 70% by weight.

The present invention further relates to a method for producing a three-dimensional article by providing a container of a non-reactive solid modeling material described above in communication with a moveable dispensing unit, subjecting at least a portion of the solid modeling material to an elevated temperature in order to produce a flowable liquid material, dispensing said flowable liquid material in desired locations of a platform or regions of a partially formed three dimensional article in order to produce said three-dimensional article.

The present invention further relates to a method for producing a three-dimensional article by providing a container of a reactive solid modeling material described above in communication with a moveable dispensing unit, subjecting at least a portion of the solid modeling material to an elevated temperature in order to produce a flowable liquid material, dispensing said flowable liquid material in desired locations of a platform or regions of a partially formed three-dimensional article in order to produce said three-dimensional article.

The at least partially formed three-dimensional article to a finishing temperature resulting from the non-reactive or reactive-based system can be exposed to a finishing temperature that is greater than the temperature needed to produce a flowable liquid material. Alternatively, the at least partially formed three-dimensional articles can be exposed to ultraviolet radiation in addition to the exposure to a finishing temperature or instead of a finishing temperature

DETAILED DESCRIPTION OF THE INVENTION

A preferred embodiment of the present invention is the use of the novel hot melt material in a selective deposition modeling system, particularly a thermal stereolithograhy system. The most preferred thermal stereolithography system is available from 3D Systems under the tradename Actua. The present invention, however, is not limited to use solely in such thermal stereolithography systems. Rather, the present invention can be employed in substantially any selective modeling system wherein a phase change material is applied in successive layers as a liquid, and subsequently hardens to produce a three dimensional article.

A conventional thermal stereolithography system is described in U.S. Pat. No. 5,695,707, which is incorporated herein by reference, assigned to 3D Systems, Inc. The system comprises at least one dispensing nozzle coupled to an x-y translation means, at least one flexible tube, a frame, and a moveable platform. The dispensing nozzle(s) is (are) coupled to the x-y translation means, which is coupled to the frame. The dispensing nozzle(s) is (are) coupled to a modeling material container by means of the flexible tube.

The moveable platform is capable of moving vertically relative to the frame, the x-y translation means and dispensing nozzle, via a platform elevator. The x-y translation means and platform elevator are in communication with a control computer, which utilizes, either directly or indirectly, a CAD system or program. Signals from the control computer cause the x-y translation means and platform elevator to move horizontally or vertically, respectively. Together, the control computer, the x-y translation means and platform elevator provide the ability to selectively dispense modeling material to any preselected position on the platform or on a partially formed part on the platform. The resulting three-dimensional article can be subjected to an elevated finishing temperature or light energy as a post-formation step to improve the mechanical and physical properties of the article.

The preferred modeling material is a phase change material or hot melt material that is solid at ambient conditions but melts when subjected to temperatures in excess of about 60° C. For purposes of this application, ambient conditions mean a temperature of about 25° C. and atmospheric pressure. Additionally, the preferred modeling material has a viscosity in the range of about 10 to 50 centipoise, more preferably in the range of about 10 to 25 centipoise, at its dispensing temperature. A conventional benchmark dispensing temperature is 130° C. A preferred modeling material that meets these requirements comprises at least one base material that serves as a backbone for the modeling material and optionally a cure agent or activator, a plasticizing component and a tackifying resin.

The base material is preferably a mixture containing at least one long chain homopolymer and/or copolymer. The chain may be a straight chain, though a branched chain polymer is preferred. The base material can be a thermoplastic or thermosetting material. A thermoplastic material repeatedly softens when subjected to heat. A thermosetting material generally cures to form a hardened material when subjected to heat or other curing conditions. Mixtures of thermoplastic and theromosetting materials can be used.

A preferred thermoplastic material suitable for the present invention is solid at ambient conditions but forms a flowable liquid when subjected to temperatures in excess of about 60° C., more preferably in excess of about 70° C. The thermoplastic material preferably exhibits low volume shrinkage during the phase change from a liquid to a solid. More preferably, the volume shrinkage is less than about 15%, most preferably less than about 10%.

Commercial thermoplastic materials useful in this application can be copolymers. Copolymers suitable for use in the present invention can contain alternating, random, or block monomeric units. The monomeric units are preferably derived from aromatic compounds that can be substituted with alkyl, alkoxy, alkenyl, or halogen groups. The advantage of a coploymer is that the physical properties of the overall polymeric molecule and formulation thereof can be varied by modifying the type and ratio of monomers. Particularly preferred monomeric units are styrene and methyl styrene. Such copolymers have relatively good mechanical properties at low molecular weights and therefore have useable melt viscosities. Examples of preferred copolymers based upon mixtures of styrene and methyl styrene include Picotex LC, Kristalex 3085, Picolastic A75 and Picotex 75, which are commercially available from Hercules Chemical Company. Other suitable copolymers include aliphatic/aromatic mixed copolymers, such as Hercolite 2100, commercially available from Hercules, hydrogenated styrenic-based copolymers, such as Regalrez 1094, commercially available from Hercules, amide-urethanes, commercially available from UnionCamp, Wayne, N.J., block copolymers of styrene and butadiene, such as Kraton G 1652, commercially available from Shell, Houston, Tex., and ethylene-carbon monoxide copolymers (A-C 830, commercially available from AlliedSignal).

Examples of suitable homopolymeric materials are polyolefins, such as polyethylene (A-C 6, commercially available from AlliedSignal, Morristown, N.J. and Epolene N-14, commercially available from Eastman), polyamides (X37-523-235 and X37-4978-70, commercially available from UnionCamp), polypropylene, polybutylene, polyisobutylene and mixtures thereof. Polyethylene is most preferred.

The base material particularly suitable for use herein has a number average molecular weight greater than about 500 and less than about 10,000, more preferably the base material has a number average molecular weight greater than about 2500 and less than about 5000, most preferably about 4000. Polymeric materials suitable for this application have melt viscosities between 100 and 5000 centipoise at 130° C. Polymeric materials having a viscosity greater than about 5000 centipoise can be added only at such small percentages as to only make insignificant contributions to the properties of the overall modeling material.

In an alternative embodiment, the base material can be based in whole or in part on a reactive polymeric material, particularly a thermosetting material. The preferred reactive polymeric material reacts when subjected to elevated temperatures, ultraviolet radiation, or contacted by a curing agent. Epoxy resins, for example, cure when subjected to heat, ultraviolet radiation or activated with a curing agent. For this application, the epoxy resin should not be activated when subjected to conventional ink dispensing conditions in order to avoid premature curing. Examples of conventional curing agents are primary and secondary amines, which can be catalyzed by tertiary amines and/or imidazole, anhydrides, and Lewis acids. Ethylenically unsaturated compounds cure when subjected to ultraviolet energy, particularly when photoinitiators are present. Suitable unsaturated compounds include (meth)acrylate, di(meth)acrylates, vinyl ether monomer, and allyl monomers. Preferably, the reactive material contains an epoxy resin, vinyl ether and/or (meth)acrylate that cures when subjected to ultraviolet radiation.

The reactive polymeric material is preferably composed of a primary reactive material, a reactive modifier material, and optional customary additives. The primary reactive material, preferably about 40 to 80% by weight of the reactive material, must have good phase change properties that are discussed more fully below. The reactive modifier material, preferably about 20 to 60% by weight of the reactive material, modifies the ultimate cured physical properties. A wide range of reactive monomers are suitable modifier materials. Although the modifier material can be selected primarily on the basis of cured physical properties, compounds with poor phase change properties, such as liquids at room temperature, can only be used in limited concentrations. The customary additives include free radical stabilizers, such as Irganox 3052, and thermal stabilizers, such as Irganox 1010, which are both commercially available from Ciba Specialty Chemicals Corporation.

For the reactive formulations, a fast set inducing segment is included in the molecule of one or more primary reactive materials. Addition of the fast set inducing segment, such as polyethylene, is necessary because the vast majority of commercially available monomers are liquids or tend to super cool before solidifying. Preferably, the overall reactive modeling material has a fast set inducing segment content of about 10% to 70% by weight, more preferably about 15 to 40% by weight. For example, the reactive component in Example 9 was prepared by reacting 59 parts by weight polyethylene monoalcohol with 24 parts diisocyanate and 17 parts hydroxy methacrylate. The resulting reactive component is composed of 59% fast setting segments. Selective deposition composition Example 12 uses 70% of reactive component Example 9 and therefore has 41% (0.59×0.70) fast setting segments. Other polymer segments with fast set properties are possible although high melting point or highly polar segments would lead to undesirably high viscosities. Polyethylene oxide is an example of a polymer with high crystallinity but relatively low melt viscosity.

Table 1 below shows the set times for several commercially available reactive solids compared with Example 13 of this invention. Solid reactive compounds tend to either super cool or crystallize to polycrystalline masses with very little cohesion. Example 13 contains 69% of a monomer which that 30% by weight of a polyethylene segment for a 21% polyethylene segment content overall.

TABLE 1

Set times Reactive Solids

| Compound | Set time | Melting point |
|---|---|---|
| SR 368 (Sartomer) | >2 hours | 52–54° C. |
| Octadecyl acrylate (Aldrich) | 12 min | 32° C. |
| 1:1 mixture of Octadecyl acrylate:CD 406 (Sartomer) | 10 min (Moist crystalline mass) | 32–75° C. |
| PT 810 (epoxy from Ciba) | >2 hours | 85° C. |
| Example 13 | 2 minutes | 70° C. |

Particularly preferred primary reactive polymeric materials for this application are solid acrylate or methacrylate derivatives of polyethylene ($C_{18}$ to $C_{50}$), more preferably $C_{18}$ to $C_{36}$. A particularly preferred material is commercially available from Sartomer Company, Exton, Pa., under the tradename and SR 257 (stearyl acrylate) ($C_{18}$). Polyethylene mono or diols, although not by themselves reactive, copolymerize with epoxy monomers and thus can constitute a primary reactive polymer in cationic epoxy formulations. Unilin 425 from Baker Petrolite, Tulsa, Okla. is a preferred example of such a polyethylene monoalcohol. Solid vinyl ether monomer is available from AlliedSignal. A preferred example of a vinyl ether monomer is Vectomer 4210.

The reactive modifier material should preferably be solid and have a melting point between about 50 and 100° C. A preferred acrylate monomer is CD 406, Sartomer, which melts at 75–80° C. A preferred reactive modifier containing at least one glycidyl group is a difunctional cycloaliphatic carboxylate epoxy, CY 179, commercially available from Ciba Specialty Chemicals Corporation.

The reactive modeling material comprises, in addition to the base material, a photoinitiator and optionally an accelerator. The photoinitiator is present at about 0.2% to about 2% by weight. The selected photoinitiator is preferably optimized to maximize absorbance at the operational wavelength of the selected UV transmitter. Particularly preferred photoinitiators are Irgacure 184 or Irgacure 819 (Ciba Specialty Chemicals Corporation), Lucirin (BASF AG, Mount Olive, N.J.), and UVI 6974 (Union Carbide). Many other suitable photoinitiators are well-known and commercially available.

The reactive modeling material can optionally contain other customary additives, such as antioxidants, antifoaming agents, thixotropic agents, fillers and coloring agents to suit particular applications. Such additives must be incorporated into the modeling materials in such a manner that the resulting mixtures have an appropriate viscosity at the dispensing temperature for the selective deposition system.

In the reactive embodiment described above, the modeling material preferably contains in excess of 50% by weight of the reactive polymeric material, more preferably in excess of about 85% by weight, up to about 98% by weight, with the balance being a cure agent or activator or accelerator and optionally, at least one wax material and/or a non-reactive polymeric material.

In the embodiment utilizing a reactive polymeric material, Applicants discovered that the most advantageous properties are obtained by using a modeling material containing more than 50% by weight of the reactive polymeric material. However, in order to achieve such a high of level of reactive material and still retain properties suitable for phase change part building, the reactive polymeric material must behave in manner similar to mixtures of thermoplastics and paraffins. In other words, the reactive polymeric material must cool quickly to a reasonably hard solid, which corresponds to a "wax-like" solidification behavior. The particularly preferred reactive polymeric materials described above satisfy these requirements.

In a more preferred embodiment, the base material contains a mixture of at least one non-reactive polymeric material and at least one natural or synthetic wax. Examples of such waxes include paraffin wax and microcrystalline wax, wax of plant origin, such as, candellia wax, carnuba wax, rice wax or hohoba solid wax, wax of animal origin, mineral wax, synthesized hydrocarbon Fischer-Tropsch wax or polyethylene wax, hydrogenated wax, hardened castor oil or derivatives thereof, modified wax, montan wax derivatives, paraffin wax derivatives, microcrystalline wax derivatives or polyethylene wax derivatives, polymer wax. The waxes may be used alone, or preferably as a mixture. Waxes suitable for the present application have low melt viscosities (1–10 centipoise at 130° C.) in order to offset the higher viscosity of the support materials. The selected waxes must also cause the modeling material to solidify quickly to a pliable microcrystalline solid. Many organic materials with otherwise suitable melting points and viscosities solidify to crystalline solids with large and disruptive crystalline forms and have little cohesion between crystals. Other materials, such as sorbitol, tend to super cool to a sticky viscous liquid, which transforms over hours or days to a hard glassy solid. Neither of these alternative hardening behaviors is suitable for ink jet modeling.

The base material in the non-reactive modeling material contains about 50% by weight to about 70% by weight of at least one wax material with the balance being the non-reactive polymeric material(s) described above.

The plasticizing component provides flexibility and toughness to the hardened article by moderating the packing forces between polymeric chains as well as influencing the set time. Suitable plasticizers may be, for example, an aliphatic ester, an aromatic ester, a phosphoric acid ester, an oxyacid ester, a phthalic acid ester, an aliphatic acid ester, a polyester type plasticizer, an epoxy type plasticizer and a trimetallic acid type plasticizer. A particularly preferred plasticizer component contains at least one plasticizing agent that is solid at ambient conditions. More preferably, the plasticizer component is a mixture comprising at least one plasticizing agent that is solid under ambient conditions and at least one plasticizing agent that is liquid at ambient conditions. The addition of a solid plasticizer mitigates the tendency of plasticizers to promote undesirable supercooling characteristics as described above.

The at least one solid plasticizing agent is preferably an aromatic or cycloaliphatic-based phthalate, particularly diphenyl- or dicyclohexyl-phthalate. Preferably, said solid plasticizing agent is dicyclohexylphthalate or dibenzylphthalate, which is commercially available as Morflex 150 from Moreflex Inc. (Greensboro, N.C.), or 1,4-cyclohexane dimethanol dibenzoate, which is commercially available as Benzoflex 352 from Elsicol Chemical Corporation (Rosemont, Ill.), or diphenylisophthalate, which is commercially available from Aldrich Chemical Company (Milwaukee, Wis.).

The at least one liquid plasticizing agent is preferably an alkyl benzyl phthalate or alkyl aryl phosphate ester. Examples of suitable liquid plasticizing agents are Santicizer 278 and Santicizer 2148, which are commercially available from Solutia, St. Louis, Mo.

The plasticizing component contains at least about 10% by weight of at least one plasticizing agent that is solid at ambient temperatures. Modeling materials containing less than about 10% by weight of solid plasticizing agent exhibit unacceptably reduced flexibility when sufficient plasticizing component is added to improve flexibility. The upper limit on the amount of solid plasticizing agent is governed by the: 1) overall viscosity of the modeling material, which must have a viscosity of about 20–25 centipoise at the dispensing temperature; and 2) hardness which falls off at high plasticizer content.

The significance of the selected plasticizer is illustrated (Table 1, below) by comparing the set times of 1:1 mixtures of a base polymer, Regalite R101 (Hercules, Wilmington, Del.) with various plasticizers. The addition of a fast set plasticizer can also lead to other desirable properties of increased flexibility of the solid and decreased viscosity of the melt. However, the improved properties must be balanced against reduced hardness at higher plasticizer levels. The fastest set time in the table is for Benzoflex 352, which is a tested solid with the highest melting point. Santicizer 278 shows a decrease in set time over paraffin despite being a room temperature liquid. Morflex 150, a relatively low melting solid, shows a dramatic increase in set time. The conclusion to be draw from these results is that it is possible to achieve a good balance between set time and mechanical properties at plasticizer levels which would conventionally be considered very high.

TABLE 1

Properties of 1:1 mixtures with Regalite R101

| Second component | Set Time* | Hardness Shore D | Viscosity @ 130° C., cps. |
|---|---|---|---|
| 50% Paraffin | 30 min | 32 | 8.4 |
| 50% Benzoflex 352 | <2 min | 64 | — |
| 50% Santicizer 278 | 15 min | 36 | 40.5 |
| 25% Santicizer 278, 25% Morflex 150 | 20 min | 43 | 38.3 |
| 50% Moreflex 150 | >3 days | — | 41.4 |
| 50% diisononylphthalate | liquid | — | — |

*Time for 10 g molten material in an aluminum dish to become solid and tack-free.

The non-reactive modeling material contains at least one tackifying resin that is compatible with both the base material and the plasticizing component. The tackifying resin acts as a bridge between components of differing polarities and solubilities in order to produce a homogenous single-phase solution. The preferred base materials described above are soluble in aromatic solvents and have a MMAP cloud point less than 80° C. (MMAP is 1:2 mixture of methylcyclohexane and aniline) and have a polarity measured by DACP cloud point of less than 42° C. (DACP; 1:1 mixture of xylene and 4-hydroxy-4-methyl-2-pentanone). A low MMAP cloud point indicates that the material is more aromatic character. A low DACP indicates higher polarity. An alternative measure of solubility for aromatic resins is OMS cloud point (OMS means odorless mineral spirits). The OMS cloud point should be below the melting point of the formulation, which is preferably in the range of 50–75° C. The preferred plasticizing component is soluble in both MMAP and OMS and has a high polarity of indicated by a DACP cloud point of less than −30° C. Escorez 5320, from Exxon Chemical Company, Floral 85 and Floral 105, from Hercules are particularly preferred tackifying resins.

The non-reactive modeling material can optionally contain other customary additives, such as antioxidants, antifoaming agents, thixotropic agents, fillers and coloring agents to suit particular applications. Such additives must be incorporated into the modeling materials in such a manner that the resulting mixtures have an appropriate viscosity at the dispensing temperature for the selective deposition system.

The non-reactive modeling material preferably contains about 50% to 70% by weight, more preferably about 60% to 65% of base material, about 8% to 15%, more preferably about 10% to 12% of plasticizing agent, and about 15% to 30%, more preferably about 20% to 25% of tackifying resin, with the total amount of such components and the optional customary additives totaling 100% by weight.

Without intending to be bound to any particular theory, the base material serves as a backbone for the modeling material as it cools by beginning to gel and encapsulating the remaining components within a fixed volume. Once the modeling material has cooled, the base material is the primary contributor to the mechanical properties of the hardened article. An important aspect of this invention is the provision of a long-chain polymeric material, which upon solidification, allows a plasticizing agent to be located in the interstitial spaces amongst and between adjacent polymeric molecules. A polymeric material having at least some branching is particularly preferred in order to permit long range chain entanglement. Such chain entanglement allows the addition of a sufficient level of plasticizer to impart flexibility without causing a significant decrease in strength.

Modeling materials for ink jet solid modeling must quickly form a hard solid on cooling, which is in contrast to materials that super cool to viscous liquids and may require many hours to fully solidify. A super cooled liquid would not be able to hold its shape as additional layers are printed. The property of quickly forming a solid with useful mechanical properties is called "fast set" in the hot melt adhesives field. In the novel materials described herein, the desired fast set property is achieved in one of two ways. For the non-reactive formulations, a plasticizer, typically a room temperature crystalline solid, is incorporated into the compositions. The selected plasticizer counteracts the tendency of the composition to super cool due to the presence of flexible, non-crystalline components.

The preferred reactive and non-reactive modeling materials described above can be formulated by combining the desired components in a stainless steel kettle having a heating source and stirring mechanism. The kettle is heated to a temperature of 130° C. while stirring the components at a rate of 20–60 rpm using a mechanical blade stirrer. The stirring at an elevated temperature is continued until a clear homogenous solution is obtained. The molten material is then filtered and then poured into a dispensing container. The dispensing containing is then affixed to a selective deposition modeling system as described above wherein the modeling material is liquefied and dispensed at preselected positions to produce a three-dimensional article.

The modeling material is dispensed through the nozzle which has an outlet having a particular size, which can vary based upon application. The modeling material, which is a solid at room temperature and pressure, must be heated to above its melting point. The modeling material should have a viscosity of less than 50 centipoise at the dispensing temperature. The liquefied modeling material can be dispensed by applying air pressure or by the force of gravity. The flow of such modeling material can be interrupted by means of a valve at the end of the nozzle or by removing the pressure.

The present invention is described more fully in the following non-limiting examples.

EXAMPLE 1

Formulation with Plasticizer 24.2 parts of Picotex LC (a copolymer resin made from styrene and α-methylstyrene manufactured by Hercules Chemical Company), 4.2 parts Epolene N14 (a polyethylene resin, $M_w$ 4000, manufactured by Eastman Chemical Company), 28.8 parts Escorez 5320 (a tackifier manufactured by Exxon Chemical Company), 23.2 parts Bareco C700 (a microcrystalline wax manufactured by Petrolite Chemical Company), and 18.6 parts paraffin, MP 60° C., were added to a stainless steel kettle and heated with stirring to 130° C. After a clear homogeneous solution was achieved, the molten material was filtered through a 1 micron absolute filter. Six (6) pounds of the filtrate was poured into an Actua material bottle (used as cartridge to charge the Actua 2100).

The melt viscosity of example 1 was 26.2 centipoise at 130° C. Due to the slightly higher than normal viscosity, the print head array temperature was increased from 130° C. to 139° C. The print head firing voltage was then set to give an average drop volume of 95 pl.

TABLE 1

| Test | Diagnostic measured | Example 1 |
|---|---|---|
| 1.5 × 7.5" H Bench | Distortion (in) | 0.065 |
| | Melting during build | acceptable |
| "HP" housing | Support fusing | Minor on interior cavity |
| | Support removal | acceptable |
| | Down facing surfaces | acceptable |
| | Part tackiness | acceptable |
| Test bars | Izod impact, ft-lb/in | .2 |
| | Flexural modulus, psi | 22,000 |
| | Shore D hardness | 46 |

Distortion. The "H Bench" part has two vertical posts, which are connected by a horizontal member after building that is 1.5 inches high. Shrinkage of the horizontal member pulls the posts out of vertical. The distance out of vertical is measured as distortion. An ideal material would have zero distortion.

Melting during build. Because the part is within the width of the print head, the between layer times are short and there is a tendency for the part to appear melted during building.

EXAMPLES 2–8

Mixed Plasticizers

Formulations containing greater than 10% plasticizer content were found to give a good combination of properties when at least one of the plasticizing components had a melting point above room temperature. The table below shows the composition and properties of Examples 2–8. Examples 2, 3, 4, 5 and 6 include both a liquid and a solid plasticizer, which show improved hardness and modulus over the all-liquid examples and have high impact strength. Examples 2 and 4 show preferred embodiments. In particular, Example 4 shows significantly improved toughness over the formulation without liquid plasticizer, Example 1, while retaining a higher level of hardness than would be expected from an all-liquid plasticizer. In this case, dicylohexylphthalate acts to improve toughness without a large penalty in hardness. Example 7 contains a single plasticizer component, Santicizer 278, which is a liquid at room temperature. Example 8 contains two liquid plasticizers, Santicizer 278 and Santicizer 2148.

|  | Example | | | | | | |
|---|---|---|---|---|---|---|---|
| Component | 2 | 3 | 4 | 5 | 6 | 7 | 8 |
| Picotex LC | 20.6 | 21.1 | 20.6 | 21.3 | 21.3 | 21.3 | 21.3 |
| Escorez 5320 | 24.6 | 25.1 | 24.6 | 25.4 | 25.4 | 25.4 | 25.4 |
| Epolene N14 | 3.5 | 3.6 | 3.5 | 3.64 | 3.64 | 3.64 | 3.64 |
| AC 820 | 2 |  | 2 |  |  |  |  |
| C-700 | 9.9 | 20.2 | 19.9 | 20.4 | 20.4 | 20.4 | 20.4 |
| Paraffin, mp. 60° C. | 15.9 | 16.2 | 15.9 | 16.4 | 16.4 | 16.4 | 16.4 |
| PX 100 | 10 |  |  |  |  |  |  |
| Santicizer 278 | 5.1 | 5.2 | 5.1 | 5.25 | 5.25 | 12.86 | 5.25 |
| Morflex 150 | 7.4 | 7.6 | 7.4 |  |  |  |  |
| dibenzylphthalate |  |  |  | 7.61 |  |  |  |
| diphenylisophthalate |  |  |  |  | 7.61 |  |  |
| Santicizer 2148 |  |  |  |  |  |  | 7.61 |
| Irganox 1010 | 1 | 1 | 1 |  |  |  |  |
| Total | 100 | 100 | 100 | 100 | 100 | 100 | 100 |
| Measured Properties |  |  |  |  |  |  |  |
| Viscosity at 130° C. | 21.8 | 20.2 | 21.5 | 18.1 | 17.6 | 15.6 | 15.7 |
| Flexural Modulus (N/m2) | 160 | 205 | 200 | 181 | 117 | 140 | 107 |
| Break Energy (lb-in/in) @ 50 mm/min Strain Rate | 0.1 | 0.23 | NB | 0.112 | 0.072 | NB | NB |
| Break Energy (lb-in/in) @ 200 mm/min Strain Rate |  | NB |  |  |  | 0.113 | NB |
| Izod Impact Strength | 0.19 | 0.15 | 0.21 | 0.12 | 0.14 | 0.17 | 0.14 |
| Shore "D" Hardness | 45 | 38 | 39 | 38 | 38 | 36 | 31 |
| Melting Point |  | 55.8 | 55.3 | 55 | 52 | 51.2 | 51.2 |

EXAMPLE 9
Preparation of Solid Reactive Component

In a 4 L steel reactor purged with dry nitrogen, 1.599 g (3 equivalents alcohol) of Unilin 425 (polyethylene monoalcohol Baker Petrolite) was heated to 95° C. and 666 g of isophorone diisocyanate, Creanova (6 equivalents isocyanate) added. After mixing to homogeneous solution 0.4 g dibutyltin dilaurate was added. The temperature increased due to exothermic reaction to approximately 120° C. The temperature was allowed to decrease to 100° C. over 1 hour when 432 g hydroxypropyl methacrylate (Aldrich) was added. After the initial exothermic reaction, indicated by a temperature rise to 115° C., 2 g Irganox 3052 (Ciba Specialty Chemicals) was added. The reaction was maintained at 80° C. for 2 hours. A sample measured with an IR spectrophotometer indicated complete reaction of the isocyanate. The material cooled to a hard waxy solid, Shore D 58, with a melt viscosity of 17.9 centipoise at 130° C.

EXAMPLE 10
Flexible Solid Reactive Component

In a manner analogous to example 9, 1100 g (4 eq. alcohol) of CAPA 200, polycarolactam diol, molecular weight 550 was treated with 888 g of isophoronediisocyante (8 eq. isocyanate) followed by 1066 g of Unilin 425 (2 eq. alcohol) and 746g (2eq. alcohol) SR 604 (Sartomer, propylene glycol monomethacrylate). The reaction product, a monofunctional methacrylate, was a solid at room temperature with a melt viscosity of 78.1 centipoise at 130° C. and a hardness of Shore D 24.

EXAMPLE 11
Flexible Semisolid Difunctional Reactive Component

In a manner analogous to example 9, 250 g (0.5 eq. alcohol) of CAPA 212, polycarolactam diol, molecular weight 1000 was treated with 111 g of isophorone diisocyanate (1 eq. isocyanate) followed by 72 g (0.5 eq. alcohol), hydroxypropylmethacrylate. The reaction product, a difunctional methacrylate, was a semisolid at room temperature with a melt viscosity of 256 centipoise at 130° C.

EXAMPLE 12
Photocurable Composition

A formulation of 70% by weight of the reactive compound from example 9, 15% by weight of the difunctional reactive compound from example 11, 13.5% by weight of CD 406, dimethanolcyclohexane diacrylate, (a crystalline solid, available from Sartomer Company (Exton, Pa.)), 0.5% by weight of Irgacure 184, a free radical photoinitiator (Ciba Specialty Chemicals) and 1% by weight of Irganox 3052 (free radical stabilizer, Ciba Specialty Chemicals) was prepared by mixing the molten components at 120° C.

EXAMPLE 13
Photocurable Composition

A formulation of 69.5% by weight of the reactive compound in example 10, 28% by weight of CD 406, 0.5% by weight of Lucirin photoinitiator, and 2% by weight of Irganox 3052 was prepared by mixing the molten components at 120° C.

The molten formulations in examples 12 and 13 were filtered through a 1 micron absolute filter. Six (6) pounds of the filtrate was poured into an Actua material bottles (used as cartridge to charge the Actua 2100). Parts were built on the Actua 2100 using the normal parameters for phase change materials. The parts, as built, were tack-free and were tough enough for routine handling. The parts could be placed in a PCA 250 (3D Systems) UV curing apparatus and exposed 2 hours. After exposure the physical properties of the parts had improved significantly. The properties of the formulations (test bars prepared by casting in a mold) before (green) and post cured are summarized in the table below. The results of two prior art formulations (prepared according to directions) are also shown in the table. The examples in this invention show much better mechanical properties both before and after post cure and much shorter set times.

| Property | Example 12 | Example 13 | WO 97/11837 Example 8 | WO 97/11837 Example 9 |
| --- | --- | --- | --- | --- |
| Green Properties | | | | |
| Viscosity @ 130° C. | 16.3 | 20.7 | 27 | 29 |
| Hardness (Shore D) | 28 | 18 | 24 | 16 |
| Flexural Modulus N/mm² | 185 | 90 | 70 | NT |
| Izod Impact ft-lb/in | 0.16 | NT | NT | NT |
| Set Time (Min.) | <2 | 2 | 15 | 10 |
| Post Cured Properties | | | | |
| Hardness | 56 | 66 | 25 | 38 |
| Flexural Modulus N/mm² | 1311 | 788 | 75 | 214 |
| Izod Impact ft-lb/in | 0.19 | NT | NT | NT |

The thermal stability of examples 12 and 13 were evaluated by placing the samples in open aluminum viscometer tubes in either a 100° C. or 130° C. oven and periodically measuring the viscosity. Example 12 increased from 16 centipoise to 43 centipoise over 16 days at 130° C. For Example 13, the initial rate of increase was measured for the first 24 hours. The rates were 0.5% per hour at 130° C. and 0.06% per hour at 100° C. In typical part building, a volume equal to that held in the print head at 130° C. is jetted in about 10 minutes. A useful formulation should show only modest increase in viscosity after several weeks exposure at 130° C. A larger reservoir of molten material is kept at 100° C. for days to weeks. The stability of the formulation should be 8 to 10 times more stable at the lower temperature.

EXAMPLE 14

A Reactive Formulation Containing Photocurable Epoxies

A formulation of 50% by weight of Unilin 425, 49.8% by weight CY 179, a cycloaliphatic epoxy carboxylate resin (Ciba Specialty Chemicals), 0.2% by weight of UVI 6974, commercially available from (Union Carbide, Danbury, Conn.) was prepared by mixing the molten components at 120° C. The physical properties of the formulation were evaluated by casting test samples in a silicone rubber mold. The properties are summarized in the table below.

| Property | Example 14 Green | Example 14 Post Cured |
| --- | --- | --- |
| Viscosity @ 130° C. | 5.0 | N/A |
| Hardness (Shore D) | 12 | 48 |
| Flexural Modulus N/mm² | NT | 282 |

What is claimed is:

1. A selective deposition modeling material for ink jet applications comprising:

a) a base material comprising at least one homopolymer and/or copolymer;

b) about 8 to 15% by weight of a plasticizing component, said plasticizing component containing at least 10% by weight of at least one plasticizing agent that is solid at ambient conditions, wherein the plasticizing component is a mixture of at least one plasticizing agent that is solid at ambient conditions and at least one plasticizing agent that is liquid at ambient conditions;

c) at least one tackifying resin that is compatible with the base material and the plasticizing component, wherein the modeling material has a viscosity of less than about 30 centipoise at 130° C.

2. A modeling material according to claim 1 wherein the base material comprises a mixture of long-chain polyolefinic molecules having a number average molecular weight of between about 500 and 10,000.

3. A modeling material according to claim 2 wherein the mixture of long-chain polyolefinic molecules have a number average molecular weight of about 4000.

4. A modeling material according to claim 1 wherein the base material comprises a mixture of polyolefinic molecules having sufficient branching that allows long-range chain entanglement and provides interstitial voids for the positioning of plasticizing agents between and amongst adjacent polyolefinic molecules.

5. A modeling material according to claim 1 wherein the modeling material is a homogenous single-phase solution.

6. A modeling material according to claim 1 comprising a) about 50% to 70% by weight of base material, b) about 8% to 15% of plasticizing component, c) about 15% to 30% of tackifying resin, and d) optionally, customary additives with the total amount of the recited components totaling 100% by weight.

7. A modeling material according to claim 1 comprising a) about 60% to 65% of base material, b) about 10% to 12% of plasticizing component, c) about 20% to 25% of tackifying resin, and d) optionally, customary additives with the total amount of the recited components totaling 100% by weight.

8. A modeling material according to claim 1 comprising a) about 60% to 65% of base material, b) about 10% to 12% of plasticizing component, c) about 20% to 25% of tackifying resin, and d) optionally, customary additives with the total amount of the recited components totaling 100% by weight, and wherein the base material contains a mixture of at least one thermoplastic and at least one thermosetting material.

9. A method for producing a three-dimensional article comprising:
   a) providing a container of a solid modeling material according to claim 1 in communication with a moveable dispensing unit;
   b) subjecting at least a portion of the solid modeling material to an elevated temperature in order to produce a flowable liquid material;
   c) dispensing said flowable liquid material in desired locations of a platform or regions of a partially formed three-dimensional article in order to produce said three-dimensional article.

10. A method according to claim 9 further comprising the step of subjecting the at least partially formed three-dimensional article to a finishing temperature that is greater than the temperature used in step b).

11. A method according to claim 9 further comprising the step of subjecting the three-dimensional article produced in step c) to a finishing temperature that is greater than the temperature used in step b).

12. A selective deposition modeling material for ink jet applications comprising:
   a) a base material comprising at least one branched polymer that is a homopolymer and/or copolymer;
   b) a plasticizing component containing at least 10% by weight of at least one plasticizing agent that is solid at ambient conditions;
   c) at least one tackifying resin that is compatible with the base material and the plasticizing component,
wherein the modeling material has a viscosity of less than about 30 centipoise at 130° C.

13. A selective deposition modeling material according to claim 12, comprising
   a) about 50% to 70% by weight of base material;
   b) about 8% to 15% by weight of plasticizing component; and
   c) about 15% to 30% by weight of tackifying resin.

14. A selective deposition modeling material according to claim 12, wherein the modeling material is a homogenous single-phase solution.

* * * * *